United States Patent [19]
Petrie, Jr. et al.

[11] Patent Number: 5,509,071
[45] Date of Patent: Apr. 16, 1996

[54] ELECTRONIC PROOF OF RECEIPT

[75] Inventors: Charles J. Petrie, Jr., Palo Alto, Calif.; Wayne P. Allen, Leander, Tex.

[73] Assignee: Microelectronics And Computer Technology Corporation, Austin, Tex.

[21] Appl. No.: 221,849

[22] Filed: Apr. 1, 1994

[51] Int. Cl.⁶ .................................................. H04L 9/32
[52] U.S. Cl. ............................ 380/4; 380/21; 380/25; 380/30
[58] Field of Search ............................. 380/30, 23, 25, 380/4, 21, 24

[56]  References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,393,269 | 7/1983 | Konheim et al. . |
| 4,405,829 | 9/1983 | Rivest et al. . |
| 4,458,109 | 7/1984 | Mueller-Scholer . |
| 4,649,510 | 3/1987 | Schmidt . |
| 4,658,093 | 4/1987 | Hellman . |
| 4,683,553 | 7/1987 | Mollier . |
| 4,740,890 | 4/1988 | William . |
| 4,799,061 | 1/1989 | Abraham et al. ............... 340/825.34 |
| 4,885,777 | 12/1989 | Takaragi et al. ................... 380/30 |
| 4,897,875 | 1/1990 | Pollard ................................ 380/21 |
| 4,951,196 | 8/1990 | Jackson . |
| 4,953,209 | 8/1990 | Ryder, Sr. et al. . |
| 4,956,863 | 9/1990 | Goss ..................................... 380/30 |
| 4,995,082 | 2/1991 | Schnorr . |
| 4,999,806 | 3/1991 | Chernow et al. . |
| 5,166,886 | 11/1992 | Molnar et al. . |
| 5,202,977 | 4/1993 | Pasetes, Jr. et al. . |
| 5,220,501 | 6/1993 | Lawlor et al. . |
| 5,241,599 | 8/1993 | Bellovin et al. ................... 380/21 |
| 5,319,710 | 6/1994 | Atalla et al. ...................... 380/23 |

OTHER PUBLICATIONS

Applied Cryptography; Author, Bruce Schneier; 1994 *Basic Protocols*, Chapter 3, pp. 42–65 and Reference pp. 591 and 593.

Parkinson, Kirsten L. and Swartz, Ian, Skepticism greet Apple CD plan, MacWeek, Aug. 16, 1993, vol. 7, pp. 1, 92.
Fahn, Paul, Answers to Frequently Asked Questions About Today's Cryptography, from RSA Laboratories, Version 1.0, pp. 1–52.
Bryant, Bill, Designing an Authentication System: a Dialogue in Four Scenes, Project Athena, Massachusetts Institute of Technology, pp. 1–13, Feb. 8, 1988.
Batelaan, Richard, et al., Internet Billing Service Design and Prototype Implementation, Carnegie Mellon University Information Networking Institute 1992 Final Project, Mar. 30, 1993, pp. 1–16.
Steiner, Jennifer G., et al., Kerberos: An Authentication Service for Open Network Systems, Project Athena, Massachusetts Institute of Technology, Mar. 30, 1988, pp. 1–14.

Primary Examiner—Gilberto Barron, Jr.
Attorney, Agent, or Firm—Haynes and Boone

[57]    ABSTRACT

A system for use in an electronic cryptosystem for providing a sender with electronic proof of receipt by an intended recipient of an electronic artifact is disclosed. The process is initiated by the recipient's requesting an artifact from the sender, who then obtains the recipient's transmission key and separately encrypts the requested artifact and an acknowledgment such that they are decryptable with first and second strictly private keys, respectively, known to and controlled by the sender. Next, the sender encrypts the encrypted artifact and encrypted acknowledgment together using the transmission key such that the message is decryptable only with a third strictly private key known to and controlled by the recipient, and transmits the encrypted message to the recipient. The recipient decrypts the message to recover the encrypted artifact, as well as the encrypted acknowledgment which is returned to the sender. The sender decrypts the acknowledgment using the second strictly private key to verify receipt by the recipient of the encrypted artifact and then sends the first strictly private key to the recipient to enable decryption of the encrypted artifact. Additionally, at least one alternative embodiment is disclosed for enabling a sender to prove to third parties that the intended recipient in fact received the requested artifact.

54 Claims, 5 Drawing Sheets

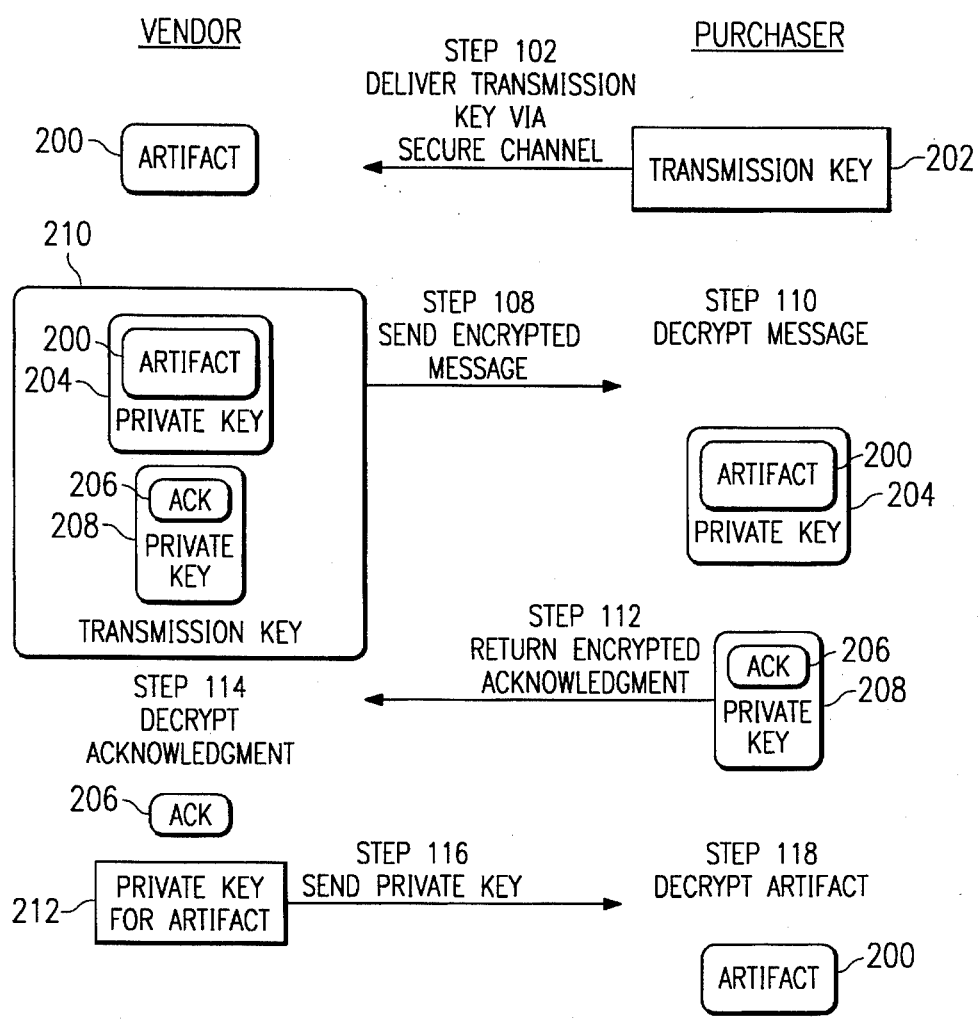
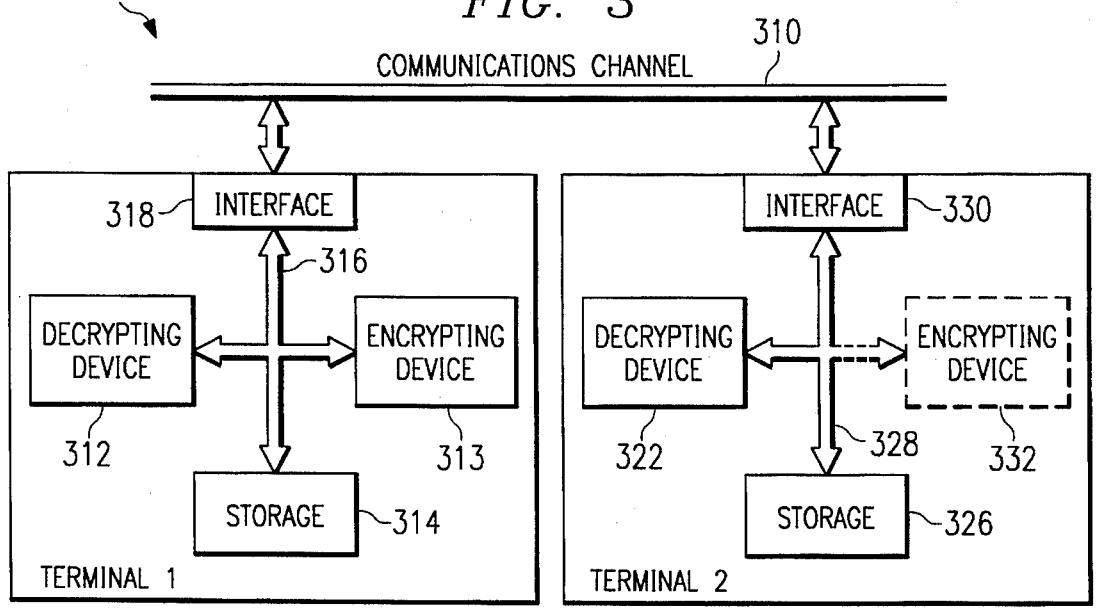

ELECTRONIC PROOF OF RECEIPT

TECHNICAL FIELD

This invention relates generally to electronic communications and, more particularly, to a system for verifying receipt of an electronic artifact in a cryptographic communications system.

BACKGROUND OF THE INVENTION

Over the past decade, as computers and computer users have grown more sophisticated, the use of electronic media to transfer information has rapidly increased. Many applications, including electronic mail ("e-mail") systems, banking systems and various electronic commerce and data processing systems, require such transfers to take place over unsecure communications channels that may be monitored by electronic "eavesdroppers." While the degree of security required will vary with respect to the particular application and the information being transferred, there will nearly always exist a requirement that the substance of a particular communication be transmitted from a sender to an intended recipient without interception and subsequent interpretation by an intermediate party. Additionally, there will typically exist a related requirement that the identity of the parties sending and/or receiving such communications be authenticated.

Accordingly, a number of cryptographic encoding systems, or cryptosystems, are available which provide some degree of confidentiality and authentication for electronic communications. In general, such cryptosystems are adapted to transfer electronic communications between remote locations and include at least one encoding device at a first location coupled to at least one decoding device at a second location via a communications channel, which may comprise a network.

Symmetric, or "private key," and asymmetric, or "public key," encryption algorithms may be employed for realizing cryptographic functions in a cryptosystem. In cryptosystems employing a symmetric encryption algorithm, such as the data encryption standard ("DES") algorithm, identical keys are employed for encrypting and decrypting messages. One problem with symmetric algorithms is that, in order for both the sender and receiver of the message to use the key, it must be transmitted to one or both of the parties in advance over a secure channel to which intermediate parties do not have access, such as registered mail or private courier. Unfortunately, such secure channels are often far too slow to be practical. It should be noted that such a key exchange may be as simple as two parties exchanging a password or as complicated as a cryptographic exchange through a trusted third party.

Alternatively, in cryptosystems that employ asymmetric encryption algorithms, different keys are used for encrypting and decrypting messages. Such cryptosystems are commonly referred to as "public key" systems and involve the generation of a key pair, one of which is "private," i.e., known to and controlled by only the party who generated, or requested the generation of, the key pair, and the other of which is "public," i.e., published for use by other users. For example, in one such system, once such a key pair has been generated, the party in possession of the keys publishes one of the keys, thereby creating a "public key," and retains control of the other key, which will function as a "private key." As a result, the public key may be used by anyone having access thereto to encrypt a message for transmission to the publishing party. However, only the private key, which is controlled by the recipient of the message, can be used to decrypt messages encrypted using the public key. Alternatively, the public key may also be used to decrypt messages that have been encrypted using the private key.

Authentication is a process whereby the receiver of an electronic communication can be confident of the identity of the sender and/or the integrity of the message. There are myriad authentication protocols known in the art and based on either conventional private key systems, such as MIT's Kerberos, or public key systems, such as RSA by RSA Data Security, Inc. For example, see B. Bryant, "Designing an Authentication System: A Dialogue in Four Scenes," Project Athena, Massachusetts Institute of Technology, Cambridge, Mass., February, 1988, DRAFT, pp. 1013; Steiner et al., "Kerberos: An Authentication Service for Open Network Systems," Proceedings of the Winter USENIX Conference, Dallas, Tex., Mar. 30, 1988, pp. 1–15; P. Fahn, "Answers to Frequently Asked Questions About Today's Cryptography," RSA Laboratories, a division of RSA Data Security, Inc., Redwood City, Calif., Sep. 14, 1992, version 1.0, DRAFT 1e, pp. 1–52. In either case, authentication services are typically provided by a trusted central administrator willing to accept the role of verifying the identity of keyholders registered with the administrator.

One problem which has not been adequately addressed in connection with electronic communications is that of providing a sender with proof that the transmitted communication, or electronic artifact, was in fact received by the intended recipient. This deficiency is especially problematic in connection with electronic commerce, wherein the sender is a vendor of an electronic product, or "artifact," such as data or software, requested by the intended recipient. Typically, the recipient will not be required to pay the vendor until he or she has received and perhaps performed a limited evaluation of the artifact. Unlike physical objects, for which the recipient's signature may be required upon delivery to serve as proof of receipt thereof, the only proof of receipt by the recipient provided to the vendor of an electronic artifact will comprise, at most, a return message generated by the computer at which the artifact was received. While such a message provides some quantum of proof that the artifact was received by someone, it does not provide adequate proof as to its receipt by the intended recipient. On the contrary, the return message may easily have been generated by an unauthorized third party masquerading as the intended recipient's computer. As a result, the vendor has extremely limited means of disproving a claim by the intended recipient that he or she never received the transmitted artifact.

Therefore, what is needed is a convenient and reliable system for providing to a sender proof of receipt by an intended recipient of an artifact conveyed as an encrypted electronic message.

SUMMARY OF THE INVENTION

The foregoing problems are solved and a technical advance is achieved by a system for providing a sender with electronic proof of receipt by an intended recipient of a functional product, such as software, or digital data (hereinafter referred to collectively as "artifact") conveyed to the intended recipient as an encrypted electronic message. In a departure from the art, the adherence to the unique protocol herein disclosed provides a sender of an electronic artifact with indisputable proof of receipt thereof by an intended recipient in the form of an electronic acknowledgment.

In a preferred embodiment, an electronic transaction between a sender, or "vendor," and a recipient, or "purchaser," is initiated when the purchaser requests an artifact from the vendor. Upon receipt of the request, the vendor obtains the purchaser's transmission key and then encrypts the requested artifact and an acknowledgment message such that they are decryptable using first and second strictly private keys, respectively, the dissemination of which is controlled by the vendor. As used herein, "dissemination" shall be interpreted to mean broad public distribution or disclosure. The vendor then encrypts the encrypted artifact and encrypted acknowledgment together as a single encrypted message using the purchaser's transmission key such that the message is decryptable only with a third strictly private key known to and controlled by the purchaser. The single encrypted message is transmitted to the purchaser, who decrypts it using the third strictly private key to recover the encrypted artifact and the encrypted acknowledgment. The encrypted acknowledgment is returned to the vendor, along with payment for the artifact, if the vendor so requires. The vendor decrypts the encrypted acknowledgment using the second strictly private key to verify that the purchaser has in fact received the artifact, as the purchaser is the only party possessing the third strictly private key necessary for decrypting the single encrypted message and recovering the encrypted acknowledgment. Once the vendor is satisfied that receipt has been established, the vendor sends the first strictly private key to the purchaser to enable him or her to decrypt and use the requested artifact.

In an alternative embodiment, before encrypting the artifact but after encrypting the acknowledgment message, the vendor makes a copy of the encrypted acknowledgment and incorporates it into the artifact in such a manner that it does not affect the functionality of the artifact. The vendor then encrypts the artifact containing the encrypted acknowledgment using the first strictly private key and the process proceeds as before. In this manner, the vendor will always be able to prove that the artifact and any copies thereof originated from the vendor, as the vendor is the only one who possesses the means to decrypt the encrypted acknowledgment incorporated therein, i.e., the second strictly private key.

In another alternative embodiment, a verification step is performed just prior to or during the purchaser's returning the encrypted acknowledgment to the vendor. For example, the vendor may require the purchaser to encrypt the encrypted acknowledgment using the third strictly private key before the return thereof to the vendor. Upon receipt of the twice encrypted acknowledgment, the vendor makes and saves a copy of it to be twice decrypted (using the transmission key then the strictly private key) in front of a judge or other third party, should a dispute ever arise as to whether the purchaser actually received the artifact. The other copy is twice decrypted by the vendor. Alternatively, such verification could be accomplished by the vendor's requiring the purchaser to return the encrypted acknowledgment via a certification authority using a verification procedure, such as Kerberos. In this manner, the authority could certify the identity of the purchaser to the vendor and the certification would serve as proof to third parties of receipt of the artifact by the purchaser.

In yet another alternative embodiment, after a purchaser requests an artifact, the vendor encrypts the artifact using a strictly private key, the dissemination of which is controlled only by the vendor, and then sends the encrypted artifact to the purchaser. Upon receipt of the encrypted artifact, the purchaser makes a copy of it and returns one copy to the vendor, along with payment for the artifact, if so required by the vendor. The vendor decrypts the returned artifact and, if the vendor is satisfied that the returned artifact is the same as the artifact originally sent to the purchaser, the vendor transmits the vendor's strictly private key to the purchaser, who is then able to decrypt the encrypted artifact for use. It should be noted that this final transmission should be performed via a secure communications channel to guard against an electronic eavesdropper intercepting both the encrypted artifact and the means for decrypting it.

A technical advantage achieved with the invention is that it provides a sender/vendor with theoretically indisputable proof that an artifact has been received by the intended recipient/purchaser in the form of an electronic acknowledgment.

A further technical advantage achieved with the invention is that it may be utilized in cryptosystems that employ either an asymmetric encryption algorithm, in which case the transmission key/third strictly private key pair will comprise a public/private key pair, or a symmetric encryption algorithm, in which case the keys will comprise a single private key of the purchaser.

BRIEF DESCRIPTION OF THE DRAWINGS

FIG. 2 is a sequential block diagram further illustrating the operation of the method of FIG. 1.

FIG. 3 is a schematic block diagram of a system for implementing the method of FIG. 1.

DETAILED DESCRIPTION OF THE PREFERRED EMBODIMENT

Figure 1:
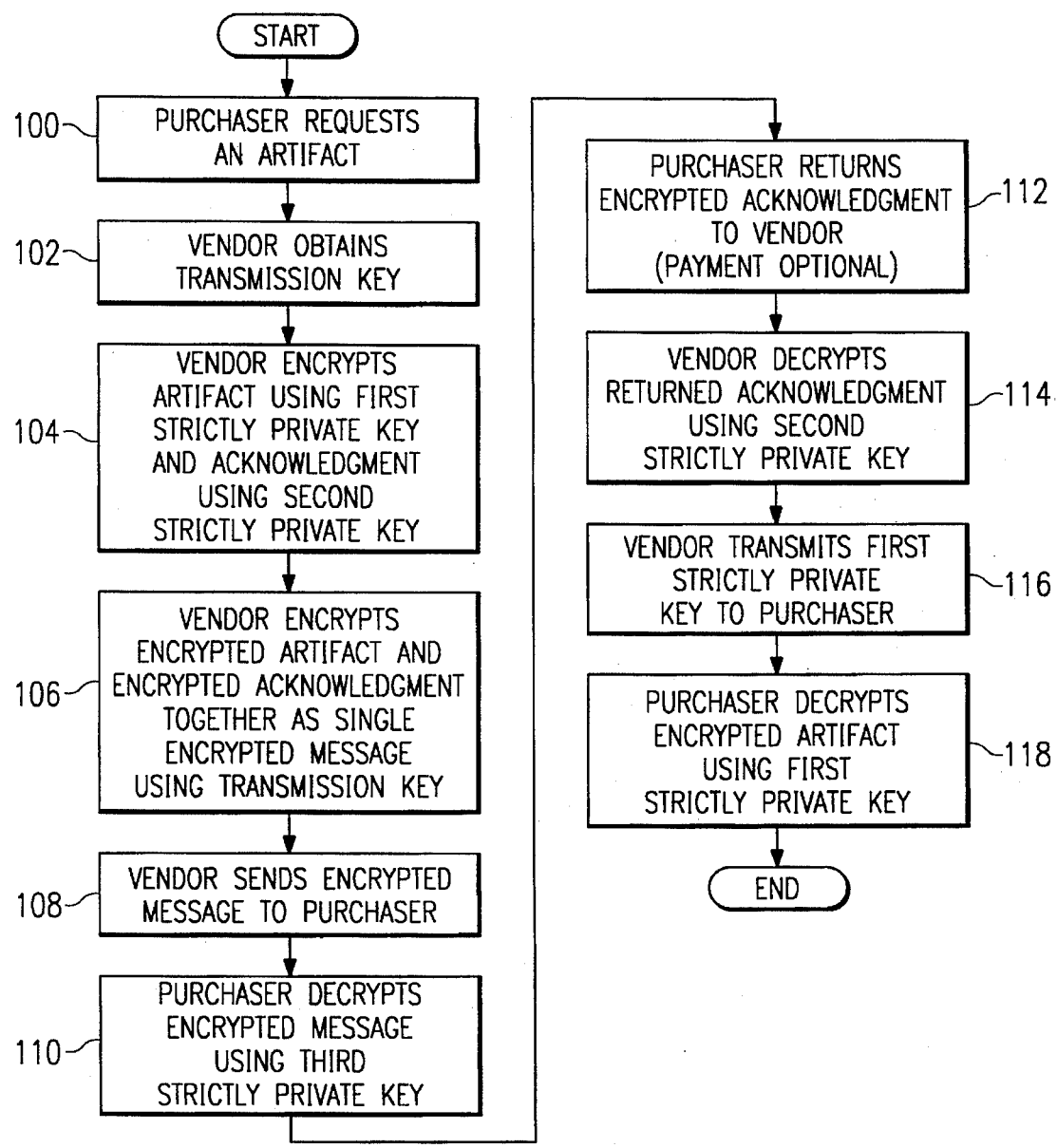
FIG. 1 is a flowchart illustrating the operation of a method embodying features of the present invention for verifying receipt of an artifact by an intended recipient.

FIGS. 1 and 2 illustrate the inventive process for providing a sender with electronic proof of receipt by an intended recipient of a functional product, such as software, or digital data (hereinafter referred to collectively as "artifact") conveyed to the intended recipient as an encrypted electronic message.

In step 100 (FIG. 1), an intended recipient (or purchaser) requests an electronic artifact 200 (FIG. 2) from a sender (or vendor). In step 102, the vendor obtains a transmission key 202 of the purchaser. It should be understood that, depending on the particular type of cryptosystem in which the inventive method is implemented, the transmission key 202 may be obtained directly from the purchaser or from a third party, such as a certifying authority, in accordance with well-known protocols established to ensure confidentiality and authenticity.

In step 104, the vendor encrypts the artifact 200 using a first strictly private key, the dissemination of which is controlled by the vendor, thereby producing encrypted artifact 204. The vendor then encrypts an acknowledgment 206 using a second strictly private key, the dissemination of which is controlled by the vendor, thereby producing encrypted acknowledgment 208. As previously stated, as used herein, "dissemination" shall be interpreted to mean broad public distribution or disclosure. The acknowledgment 206 may include information regarding the particular artifact 200, the identity of the purchaser, or other information which the vendor may wish to include therein to assist in identifying the subject matter of and party or parties involved in the particular transaction. It should be understood that the first and second strictly private keys may comprise the same key, if the vendor so desires. In step 106, the vendor encrypts the encrypted artifact 204 and encrypted acknowledgment 208 together as a single encrypted message 210 using the transmission key 202 of the purchaser obtained by the vendor in step 102. In step 108, the single encrypted message 210 is transmitted to the purchaser.

In step 110, the purchaser uses a third strictly private key, the dissemination of which is controlled by the purchaser, to decrypt the single encrypted message 210 and separate the encrypted artifact 204 from the encrypted acknowledgment 208. At this point, it should be clear that the transmission key 202 and the third strictly private key of the purchaser are related, as the latter is used to decrypt a message 210 encrypted using the former. It should be understood, therefore, that the relationship between the keys will be defined by whether the encryption algorithm used to generate the keys is symmetric or asymmetric. For example, if the algorithm is symmetric, the same key will be used as both the transmission key 202 and the third strictly private key. In this case, it should be understood that the obtaining by the vendor of the transmission key 202 in step 102 must be accomplished via a secure communications channel, the likes of which are well known in the art and are therefore not described herein. Alternatively, if the algorithm used to generate the keys is asymmetric, the transmission key 202 will comprise the "public key" component and the strictly private key of the purchaser will comprise the "private key" component of a so-called "public/private key pair" generated by an asymmetric encryption algorithm. Note that in this case, it is not necessary for the vendor to obtain the transmission key 202 in step 102 in a secure manner, because as a public key, the key 202 will be available to members of the general public.

In step 112, the purchaser returns the encrypted acknowledgment 208 to the vendor. Also in step 112, the vendor may require the purchaser to pay for the artifact 200. In step 114, the vendor decrypts the encrypted acknowledgment 208 using the second strictly private key. In this manner, the vendor is able to verify receipt by the purchaser of the encrypted artifact 204, as only the purchaser possesses the means (i.e., the third strictly private key) for decrypting the single encrypted message 210 to recover the encrypted artifact 204 and the encrypted acknowledgment 208. In step 116, if the vendor is satisfied that the acknowledgment 206 is the one originally sent to the purchaser in step 108 as part of the single encrypted message 210 and is satisfied with the mode of payment, if payment has been required in step 112, then the vendor transmits the first strictly private key to the purchaser to enable the purchaser to decrypt the encrypted artifact 204, thereby obtaining the usable artifact 200. For enhanced security, the vendor may encrypt the first strictly private key using the purchaser's transmission key before transmitting it to the purchaser.

It should be clear from the foregoing that, assuming that the keys designated as "strictly private keys" of the purchaser or vendor are in fact held in confidence by the party having control thereof, the vendor may be certain in step 114 that the purchaser has received and is in possession of the encrypted artifact 204, as no one but the purchaser (and perhaps the vendor) possesses the means for decrypting the single encrypted message 210 to recover the encrypted acknowledgment 208 returned to the vendor.

It should be clear that, even should an electronic eavesdropper intercept all of the signals transmitted between the purchaser and the vendor he or she would not be able to obtain the artifact 200, because the third strictly private key, which is necessary for decrypting the single encrypted message 210 (step 106) is never transmitted via the monitored channel. For this reason, it is important that, if a symmetric algorithm is used to generate the transmission and third strictly private keys, as discussed above, the transmission key must be obtained by the vendor in step 102 via a secure communications channel. In addition, although the first strictly private key may be sent over the channel (FIG. 3), the artifact encrypted using the first strictly private key is never sent over the channel, strictly as an artifact encrypted only by the first strictly private key.

FIG. 3 is a schematic block diagram of a system 300 for implementing the process described with reference to FIGS. 1 and 2. In the illustrated embodiment, a communications terminal of the vendor, designated as "Terminal 1," is connected to a communications terminal of the purchaser, designated as "Terminal 2," via a communications channel 310, which may comprise, for example, a network. Terminal 1 comprises a decrypting device 312, an encrypting device 313 and storage 314 interconnected via a bus 316. The bus 316 is further connected to the communications channel 310 via an interface 318 of Terminal 1.

Similarly, Terminal 2 comprises a decrypting device 322 and storage 326 interconnected via a bus 328. The bus 328 is further connected to the communications channel 310 via an interface 330. Additionally, an optional encrypting device 332 may be connected to the bus 328 for purposes which will be described. Storage 314 and 326 comprise appropriate memory devices, as well as any mass storage devices necessary for storing electronic messages and appropriate encryption/decryption keys. Additionally, storage 314 stores electronic artifacts 200, such as software, data, and other electronic products, that may be requested by the purchaser.

As should be clear from the discussion above with respect to FIG. 1, decrypting device 312 and encrypting device 313 must include, at a minimum, components for storing and for executing logic for decrypting and encrypting, respectively, electronic messages received from and transmitted to the purchaser at Terminal 2, using cryptographic keys received on the communications channel 310 and/or from storage 314. Specifically, encrypting device 313 will include logic for encrypting an artifact 200 and an acknowledgment 206 using the first and second strictly private keys, respectively, and for encrypting the encrypted artifact 204 and encrypted acknowledgment 208 together as a single encrypted message 210 using the purchaser's transmission key 202. Decrypting device 312 will include logic for decrypting the encrypted acknowledgment using the second strictly private key.

Similarly, decrypting device 322 must include, at a minimum, components for storing and for executing logic for decrypting an encrypted message received from the vendor at Terminal 1 via the communications channel 310 using cryptographic keys input thereto from the channel 310 or storage 326. Specifically, the decrypting device 322 will comprise means for decrypting the single encrypted message using the third strictly private key controlled by the purchaser and for decrypting the encrypted artifact 204 using the first strictly private key supplied to the purchaser by the vendor via the channel 310. Components and logic for implementing decrypting devices 312 and 322 and encrypting devices 313 and 332 will be apparent to the skilled artisan based upon the state of the art in view of the present disclosure, and will therefore not be described in further detail.

It should be understood that Terminal 2 may also include logic for generating the transmission key and third strictly private key; alternatively, these keys may be generated by a third party, such as a certifying authority, and transmitted to the purchaser at Terminal 2 via a secure communications channel. It should also be understood that if the transmission key/third strictly private key key pair is generated using an asymmetric algorithm, the transmission key will comprise a "public key," which should be appropriately published by the purchaser using any number of known methods.

Figure 4:
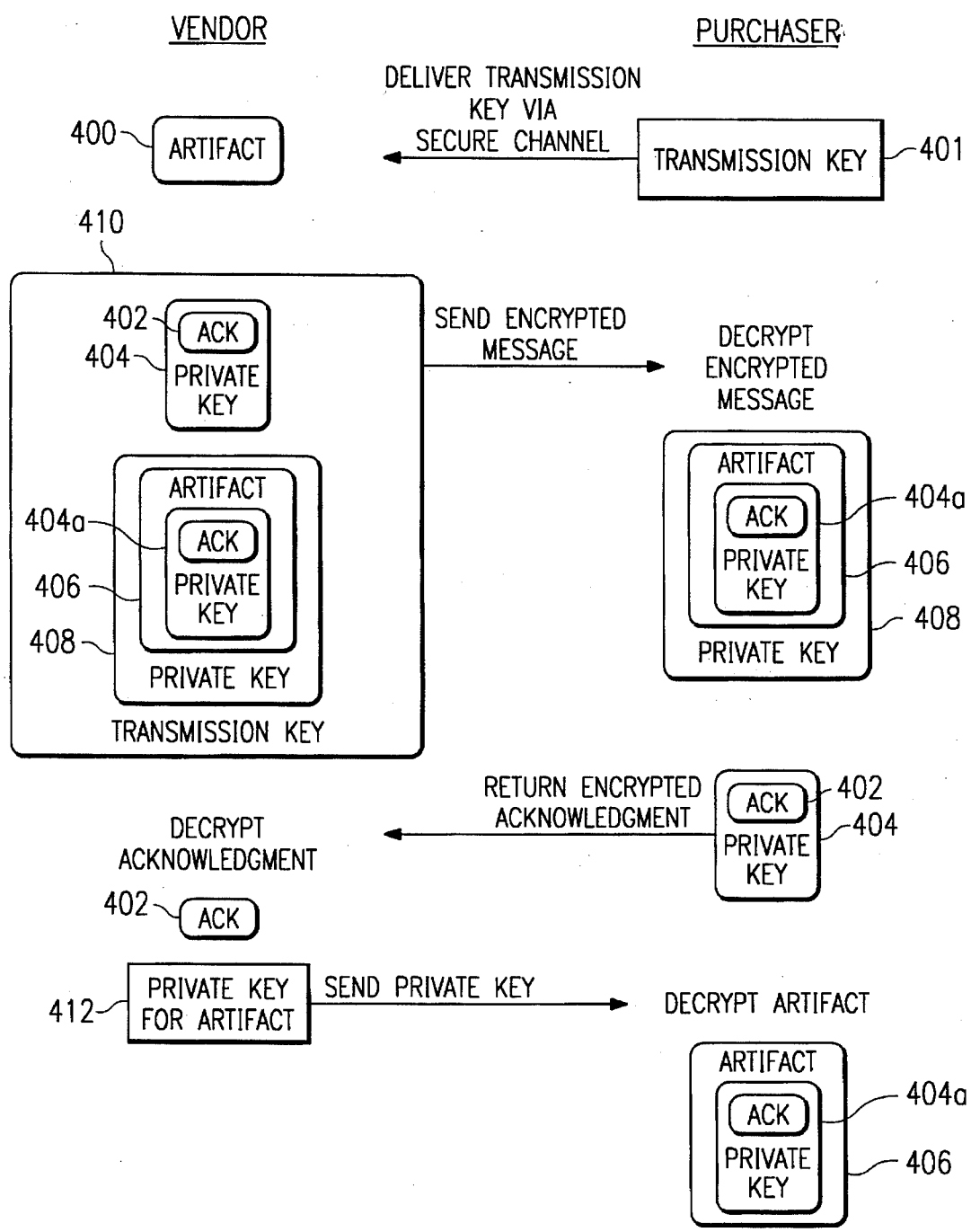
FIG. 4 is a sequential block diagram illustrating the operation of an alternative embodiment of the method of FIG. 1.

FIG. 4 illustrates an alternative embodiment of the present invention in which means are provided for enabling a vendor to prove that a particular artifact originated from the vendor. Similar to the flowchart shown in FIG. 1, the process is initiated by a purchaser's requesting an artifact 400 and the vendor's obtaining a transmission key 401 from the purchaser via a secure communications channel, as previously described with reference to step 102 (FIG. 1). The vendor encrypts an acknowledgment 402, which is similar to the acknowledgment 206, using a first strictly private key, the dissemination of which is controlled by the vendor, to produce an encrypted acknowledgment 404. The vendor then makes a copy of the encrypted acknowledgment 404, which is designated by reference numeral 404a. Copy 404a may be made by directly copying encrypted acknowledgement 404 or by encrypting a direct copy of acknowledgement 402. The vendor next incorporates the copy 404a in the requested artifact 400 to produce a verified artifact 406. It should be understood that the encrypted acknowledgment copy 404a should be incorporated in the artifact 400 in a manner such that it does not affect the operation or functionality of the artifact 400 and is therefore invisible to a user. In other words, insofar as the user is concerned, the verified artifact 406 functions identically to the artifact 400.

Next, the vendor encrypts the verified artifact 406, using a second strictly private key, the dissemination of which is controlled by the vendor, to produce an encrypted verified artifact 408. The encrypted verified artifact 408 and the encrypted acknowledgment 404 are encrypted together as a single encrypted message 410 using the transmission key 401 received from the purchaser.

The single encrypted message 410 is transmitted to the purchaser, who decrypts the message 410 using a third strictly private key, the dissemination of which is controlled by the purchaser, to recover the encrypted verified artifact 408, as well as the encrypted acknowledgment 404. The encrypted acknowledgment 404 is returned to the vendor along with payment for the artifact 400, if so required by the vendor. Again, it should be clear from the foregoing that the transmission key 401 and the third strictly private key of the purchaser are related, as the latter is used to decrypt a message 410 encrypted using the former, and that their relationship is defined by whether the encryption algorithm used to generate the keys is symmetric or asymmetric, as previously described in detail.

The vendor decrypts the encrypted acknowledgment 404, using the first strictly private key, thereby verifying receipt and possession by the purchaser of the encrypted verified artifact 408. Once the vendor is satisfied that the purchaser has received the artifact 400 and payment, if required, has been made, the vendor transmits the second strictly private key 412 to the purchaser, who uses it to decrypt the encrypted verified artifact 408 to recover the verified artifact 406.

In this manner, because the verified artifact 406 contains the encrypted acknowledgment copy 404a, which is decryptable only using the vendor's first strictly private key, the vendor is able to prove that the verified artifact 406, or copies thereof, originated from him or her by decrypting the encrypted acknowledgment copy 404a incorporated therein. It should be noted that, because the encrypted acknowledgment 404 and the acknowledgment copy 404a are identical, they may be used interchangeably, with the encrypted acknowledgment 404 incorporated into the artifact 400 and the copy 404a used to verify receipt. It should also be understood that the system 300 of FIG. 3 may be used to implement the method shown and described with respect to FIG. 4.

Figure 5:
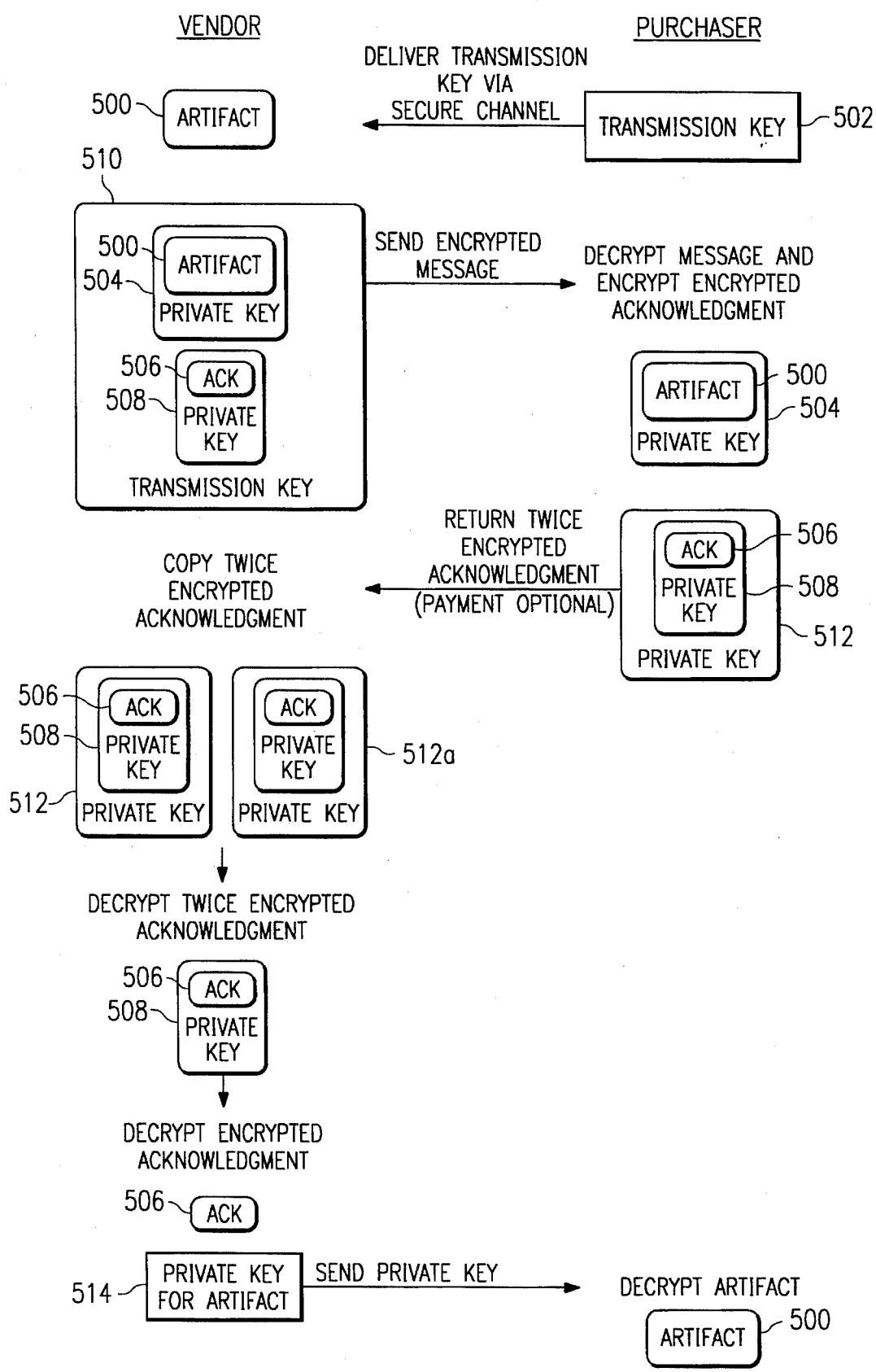
FIG. 5 is a sequential block diagram illustrating the operation of another alternative embodiment of the method of FIG. 1.

FIG. 5 illustrates another alternative embodiment, in which means are provided for enabling the vendor to prove to a third party that the purchaser in fact received the requested artifact. This technique would be especially useful in situations in which the purchaser denies having received the requested artifact and returning the acknowledgment and the vendor must prove otherwise to a judge or other third party. In other words, while receipt by the vendor of the encrypted acknowledgment 208 (FIG. 2) in step 114 (FIG. 1) proves to the vendor that the purchaser received and decrypted the encrypted message 210 to recover the encrypted artifact 204, it does not provide unequivocal proof of that fact to a third party, absent acquiescence by the purchaser.

Again, the process is initiated by a purchaser's requesting an artifact 500 and the vendor's obtaining a transmission key 502 of the purchaser via a secure communications channel, as described with respect to step 102 (FIG. 1). The vendor encrypts the artifact 500, using a first strictly private key, the dissemination of which is controlled by the vendor, to produce an encrypted artifact 504, encrypts an acknowledgment 506, using a second strictly private key, the dissemination of which is controlled by the vendor, to produce an encrypted acknowledgment 508, and encrypts the encrypted artifact 504 and encrypted acknowledgment 508 together as a single encrypted message 510 using the transmission key 502. The encrypted message 510 is transmitted to the purchaser, who decrypts it using a third strictly private key, the dissemination of which is controlled by the purchaser.

At this point, which corresponds to step 112 of the flowchart of FIG. 1, an authentication step must be performed, it being understood that there are various authentication techniques available and that an acceptable means of authentication must be agreed upon by the vendor and purchaser. One means of authentication, which is illustrated in FIG. 5, is for the vendor to require the purchaser to encrypt the encrypted acknowledgment 508 using the third strictly private key to produce a twice encrypted acknowledgment 512. The twice encrypted acknowledgment 512 is returned to the vendor, along with payment for the artifact 500, if so required by the vendor. The vendor then makes a copy of the twice encrypted acknowledgment 512, which is designated by reference numeral 512a. The copy 512a is saved by the vendor for purposes which will subsequently be described.

The vendor then decrypts the twice encrypted acknowledgment 512 twice, first using the transmission key 502 to recover the encrypted acknowledgment 508 and then using the second strictly private key to recover the acknowledgment 506. Once the vendor is satisfied that the purchaser has received the encrypted artifact 504 and payment, if required, has been made, the vendor transmits the first strictly private key 514 to the purchaser, who uses it to decrypt the encrypted artifact 504.

The copy 512a of the twice encrypted acknowledgment 512 is saved by the vendor to be used as proof to a third party of receipt by the purchaser of the encrypted artifact 504, should the purchaser dispute that fact. Specifically, assuming that the key pair comprising the transmission key/third strictly private key is generated using an asymmetric encryption algorithm (i.e., the keys are not identical), the fact that the twice encrypted acknowledgment copy 512a is decryptable by the vendor using the transmission key 502 proves that the purchaser must have been in possession of the encrypted acknowledgment 508 and encrypted it using the third strictly private key to produce the twice encrypted acknowledgment 512, as the purchaser is the only one in possession of the third strictly private key. In this regard, it should be noted that the foregoing will not be true where the transmission key/third private key pair are generated using a symmetric encryption algorithm (i.e., the keys are identical), as the vendor, as well as the purchaser, could have encrypted the encrypted acknowledgment 508 to produce the twice encrypted acknowledgment 512. It should be understood that, because the twice encrypted acknowledgement 512 and twice encrypted acknowledgement copy 512a are identical, they may be used interchangeably, with the twice encrypted acknowledgement 512 saved and copy 512a decrypted. It should also be understood that the system 300 of FIG. 3 may be used to implement the system shown and described in connection with FIG. 5. If so, Terminal 2 must include the optional encrypting device 332, which will comprise means for encrypting the encrypted acknowledgment 508 using the third strictly private key.

Alternatively, authentication may be accomplished by requiring the purchaser to return the encrypted acknowledgment 508 via a trusted third party, such as Kerberos, that agrees to vouch for or "certify" the identity of the purchaser. After certifying the identity of the purchaser, the third party transmits both the encrypted acknowledgment 508 and the certification to the vendor. As such certification procedures are well known, they will not be further discussed.

Figure 6:
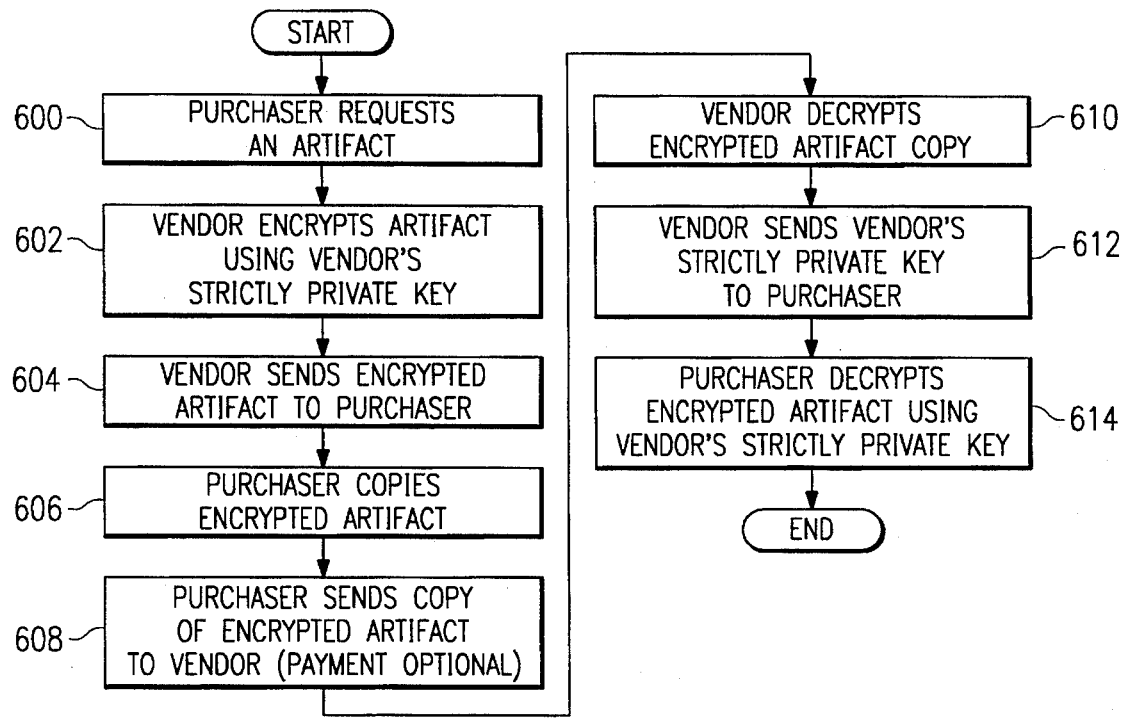
FIG. 6 is a flowchart illustrating the operation of yet another alternative embodiment of a method embodying features of the present invention for verifying receipt of an artifact by an intended recipient.
Figure 7:
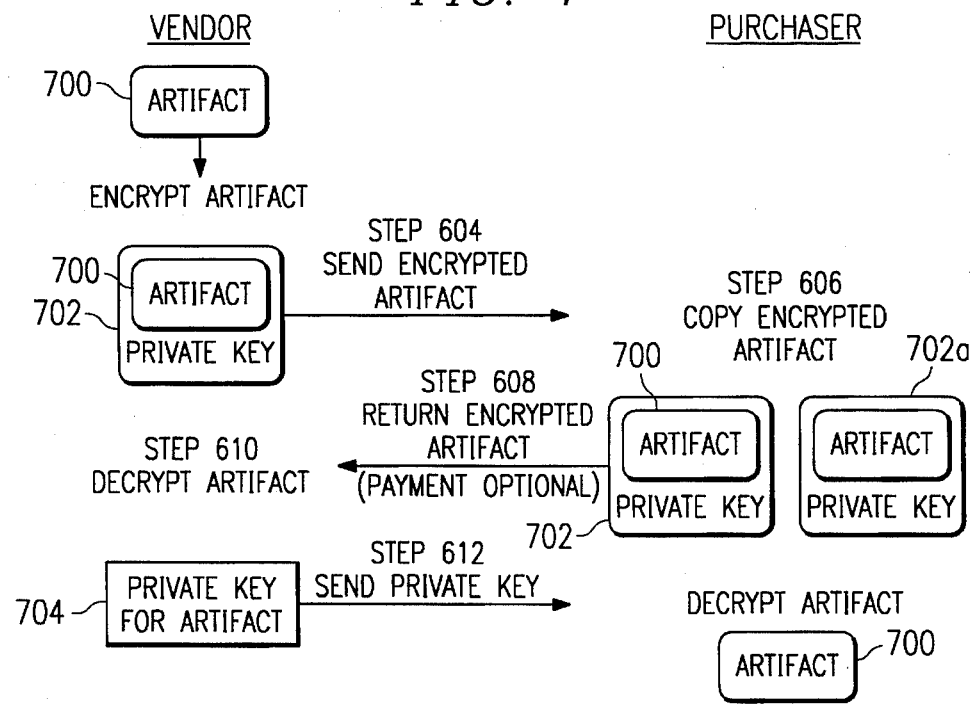
FIG. 7 is a sequential block diagram further illustrating the operation of the method of FIG. 6.

Yet another alternative embodiment is illustrated in FIGS. 6 and 7. In step 600 (FIG. 6) the purchaser requests an artifact 700 (FIG. 7). In step 602, the vendor encrypts the artifact 700, using a strictly private key, the dissemination of which is controlled only by the vendor, to produce an encrypted artifact 702. In step 604, the vendor transmits the encrypted artifact 702 to the purchaser. In step 606, the purchaser makes a copy of the encrypted artifact 702, which is designated by reference numeral 702a, and returns the encrypted artifact 702 (or the copy 702a) to the vendor in step 608 along with payment for the artifact 700, if so required by the vendor.

In step 610, the vendor decrypts the encrypted artifact 702 (or the copy 702a) using the first strictly private key to determine whether the returned artifact is in fact the artifact 700 sent to the purchaser as the encrypted artifact 702 in step 604. Once the vendor is satisfied that the purchaser has received the encrypted artifact 702, and payment, if required, has been made, the vendor transmits the first strictly private key 704 to the purchaser in step 612. It should be understood that the transmission of the vendor's strictly private key in step 612 should be performed over a secure communications channel, to prevent unauthorized third parties from intercepting the key 704 and using it to decrypt a copy of the encrypted artifact intercepted during transmission in step 604 or step 608. In step 614, the purchaser uses the strictly private key 704 to decrypt the encrypted artifact 702a (or the encrypted artifact 702) and recover the artifact 700. Again, it should be understood that the method shown and described in connection with FIGS. 6 and 7 may be implemented using the system 300 (FIG. 3).

It is understood that the present invention can take many forms and embodiments. The embodiments shown herein are intended to illustrate rather than to limit the invention, it being appreciated that variations may be made without departing from the spirit or the scope of the invention. For example, although the invention has been described with reference to a commercial transaction in which the parties are a vendor and a purchaser of electronic artifacts, the method may also be effectively employed in noncommercial transactions wherein one party desires indisputable proof that the other party has received a transmitted artifact, which may comprise, in this instance, a confidential communication. In addition, Terminals 1 and 2 may be configured so that they each contain the functionality embodied in both terminals, so that both terminals may operate as a "purchaser" and/or a "vendor" in a given transaction.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of validating receipt of an artifact conveyed as an encrypted electronic message from a sender to a recipient, the method comprising:

said recipient requesting an artifact and providing a transmission key;

said sender obtaining said transmission key;

encrypting said artifact so that it is decryptable only by a first strictly private key known to said sender with dissemination of said first strictly private key controlled only by said sender;

encrypting an acknowledgment so that it is decryptable only by a second strictly private key known to said sender with dissemination of said second strictly private key controlled only by said sender;

encrypting with said transmission key said encrypted artifact and said encrypted acknowledgment together as a single encrypted message decryptable only by a third strictly private key known to said recipient with dissemination of said third strictly private key controlled only by said recipient;

sending said single encrypted message to said recipient;

said recipient using said third strictly private key to decrypt said single encrypted message to separate said encrypted artifact and said encrypted acknowledgment;

returning said encrypted acknowledgment to said sender after using said third strictly private key;

said sender using said second strictly private key to decrypt said returned encrypted acknowledgment to verify receipt by said recipient of said encrypted artifact;

sending said first strictly private key to said recipient after said verification; and said recipient using said sent first strictly private key to decrypt said encrypted artifact.

2. The method of claim 1 wherein said returning further comprises forwarding payment for said requested artifact to said sender along with said encrypted acknowledgment.

3. The method of claim 1 wherein said transmission key and said third strictly private key are identical keys generated using a symmetric encryption algorithm.

4. The method of claim 1 wherein said transmission key and said third strictly private key are a public key and a private key, respectively, comprising a public/private key pair generated using an asymmetric encryption algorithm.

5. The method of claim 1 further comprising said recipient generating said transmission key and said third strictly private key.

6. The method of claim 1 further comprising:
   a third party generating said transmission key and said third strictly private key; and
   transmitting said third strictly private key and said transmission key to said recipient via a secure communications channel.

7. The method of claim 1 wherein said providing further comprises publishing said transmission key.

8. The method of claim 1 further comprising, prior to said encrypting of said artifact, said sender incorporating a copy of said encrypted acknowledgment into said artifact such that functionality of said artifact is not affected.

9. The method of claim 1 further comprising prior to said sending of said first strictly private key, authenticating that said returned encrypted acknowledgment originated from said recipient.

10. The method of claim 9 wherein said authenticating comprises prior to said returning, said recipient encrypting with said third strictly private key said encrypted acknowledgment so that it is decryptable only by said transmission key.

11. The method of claim 10 wherein said authenticating further comprises:
   prior to said sender using said second strictly private key to decrypt said returned encrypted acknowledgment, said sender copying said returned encrypted acknowledgment; and
   said sender using said transmission key to decrypt said returned encrypted acknowledgment.

12. The method of claim 11 wherein said authenticating further comprises said sender saving said returned encrypted acknowledgment copy.

13. The method of claim 9 wherein said authenticating comprises:
   said recipient transmitting said encrypted acknowledgment to a trusted third party;
   said trusted third party certifying that said encrypted acknowledgment originated from said recipient; and
   said trusted third party transmitting evidence of said certification and said encrypted acknowledgment to said sender.

14. The method of claim 13 wherein said trusted third party uses Kerberos.

15. A method of validating receipt of an artifact conveyed as an encrypted electronic message from a sender to a recipient, the method comprising:
   generating a key pair comprising a public key and a private key using an asymmetric encryption algorithm, wherein said private key is known to and the dissemination thereof is controlled only by said recipient;
   publishing said public key;
   said recipient requesting an artifact;
   said sender obtaining said public key;
   encrypting said artifact so that it is decryptable only by a first key known to said sender with dissemination of said first key controlled only by said sender;
   encrypting an acknowledgment so that it is decryptable only by a second key known to said sender with dissemination of said second key controlled only by said sender;
   encrypting with said public key said encrypted artifact and said encrypted acknowledgment together as a single encrypted message decryptable only by said private key;
   sending said single encrypted message to said recipient;
   said recipient using said private key to decrypt said single encrypted message to separate said encrypted artifact and said encrypted acknowledgment;
   returning said encrypted acknowledgment to said sender after using said private key;
   said sender using said second key to decrypt said returned encrypted acknowledgment to verify receipt by said recipient of said encrypted artifact;
   sending said first key to said recipient after said verification; and
   said recipient using said sent first key to decrypt said encrypted artifact.

16. The method of claim 15 wherein said returning further comprises forwarding payment for said requested artifact to said sender along with said encrypted acknowledgment.

17. The method of claim 15 wherein said generating is performed by said recipient.

18. The method of claim 15 wherein said generating is performed by a trusted third party, the method further comprising transmitting said private key to said recipient via a secure communications channel.

19. The method of claim 15 further comprising, prior to said encrypting of said artifact, said sender incorporating a copy of said encrypted acknowledgment into said artifact in a manner such that functionality of said artifact is not affected.

20. The method of claim 15 further comprising prior to said sending of said first key, authenticating that said returned encrypted acknowledgment originated from said recipient.

21. The method of claim 20 wherein said authenticating comprises prior to said returning, said recipient encrypting with said private key said encrypted acknowledgment so that it is decryptable only by said public key.

22. The method of claim 21 wherein said authenticating further comprises:
   prior to said sender using said second key to decrypt said returned encrypted acknowledgment, said sender copying said returned encrypted acknowledgment; and
   said sender using said public key to decrypt said returned encrypted acknowledgment.

23. The method of claim 22 wherein said authenticating further comprises said sender saving said returned encrypted acknowledgment copy.

24. The method of claim 20 wherein said authenticating comprises:
   said recipient transmitting said encrypted acknowledgment to a trusted third party;
   said trusted third party providing certification that said encrypted acknowledgment originated from said recipient; and said trusted third party transmitting said certification and said encrypted acknowledgment to said sender.

25. The method of claim 24 wherein said trusted third party uses Kerberos.

26. A method of validating receipt of an artifact conveyed as an encrypted electronic message from a sender to a recipient, the method comprising:

generating a transmission key using a symmetric encryption algorithm, wherein said transmission key is known to and the dissemination thereof is controlled only by said recipient;

said recipient requesting an artifact;

said sender obtaining said transmission key via a secure communications channel;

encrypting said artifact so that it is decryptable only by a first key known to said sender with dissemination of said first key controlled only by said sender;

encrypting an acknowledgment so that it is decryptable only by a second key known to said sender with dissemination of said second key controlled only by said sender;

encrypting with said transmission key said encrypted artifact and said encrypted acknowledgment together as a single encrypted message decryptable only by said transmission key;

sending said single encrypted message to said recipient;

said recipient using said transmission key to decrypt said single encrypted message to separate said encrypted artifact and said encrypted acknowledgment;

returning said encrypted acknowledgment to said sender after using said transmission key;

said sender using said second key to decrypt said returned encrypted acknowledgment to verify receipt by said recipient of said encrypted artifact;

sending said first key to said recipient after said verification; and said recipient using said sent first key to decrypt said encrypted artifact.

27. The method of claim 26 wherein said returning further comprises forwarding payment for said requested artifact to said sender along with said encrypted acknowledgment.

28. The method of claim 26 wherein said generating is performed by said recipient.

29. The method of claim 26 wherein said generating is performed by a trusted third party, the method further comprising transmitting said transmission key to said recipient via a second secure communications channel.

30. The method of claim 26 further comprising, prior to said encrypting of said artifact, said sender incorporating a copy of said encrypted acknowledgment into said artifact in a manner such that functionality of said artifact is not affected.

31. The method of claim 26 further comprising prior to said sending of said first key, authenticating that said returned encrypted acknowledgment originated from said recipient.

32. The method of claim 31 wherein said authenticating comprises:

said recipient transmitting said encrypted acknowledgment to a trusted third party;

said trusted third party certifying that said encrypted acknowledgment originated from said recipient; and said trusted third party transmitting evidence of said certification and said encrypted acknowledgment to said sender.

33. The method of claim 32 wherein said trusted third party is Kerberos.

34. A method of validating receipt of an artifact conveyed as an encrypted electronic message from a sender to a recipient, the method comprising:

said recipient requesting an artifact;

said sender encrypting said artifact so that it is decryptable only by a strictly private key known to said sender with dissemination of said strictly private key controlled only by said sender;

sending said encrypted artifact to said recipient;

said recipient copying said encrypted artifact;

returning a copy of said encrypted artifact to said sender;

wherein said returning further comprises forwarding payment for said requested artifact to said sender along with said encrypted acknowledgement copy;

said sender using said strictly private key to decrypt said returned encrypted artifact copy to verify receipt by said recipient of said encrypted artifact;

sending said strictly private key to said recipient after said verification; and said recipient using said sent strictly private key to decrypt said encrypted artifact.

35. A method of validating receipt of an artifact conveyed as an encrypted electronic message from a sender to a recipient, the method comprising:

said recipient requesting an artifact;

said sender encrypting said artifact so that it is decryptable only by a strictly private key known to said sender with dissemination of said strictly private key controlled only by said sender;

transmitting said strictly private key to said recipient via a secure communications channel;

sending said encrypted artifact to said recipient;

said recipient copying said encrypted artifact;

returning a copy of said encrypted artifact to said sender;

said sender using said strictly private key to decrypt said returned encrypted artifact copy to verify receipt by said recipient of said encrypted artifact;

sending said strictly private key to said recipient after said verification; and said recipient using said sent strictly private key to decrypt said encrypted artifact.

36. Apparatus for validating receipt of an artifact conveyed as an encrypted electronic message from a sender to a recipient, the apparatus comprising:

means for enabling said recipient to request an artifact and to provide a transmission key;

means for enabling said sender to obtain said transmission key;

means for encrypting an artifact so that it is decryptable only by a first strictly private key known to said sender with dissemination of said first strictly private key controlled only by said sender;

means for encrypting an acknowledgment so that it is decryptable only by a second strictly private key known to said sender with dissemination of said second strictly private key controlled only by said sender;

means for encrypting with said transmission key said encrypted artifact and said encrypted acknowledgment together as a single encrypted message decryptable only by a third strictly private key known to said recipient with dissemination of said third strictly private key controlled only by said recipient;

means for sending said single encrypted message to said recipient;

means for decrypting said single encrypted message using said third strictly private key to separate said encrypted artifact and said encrypted acknowledgment;

means for returning said encrypted acknowledgment to said sender after using said third strictly private key;

means for decrypting said returned encrypted acknowledgment using said second strictly private key to verify receipt by said recipient of said encrypted artifact;

means for sending said first strictly private key to said recipient after said verification; and means for decrypting said encrypted artifact using said first strictly private key.

37. The apparatus of claim 36 further comprising means for forwarding payment for said requested artifact to said sender along with said encrypted acknowledgment.

38. The apparatus of claim 36 wherein said transmission key and said third strictly private key are the same key generated using a symmetric encryption algorithm.

39. The apparatus of claim 36 wherein said transmission key and said third strictly private key are a public key and a private key, respectively, comprising a public/private key pair generated by an asymmetric encryption algorithm.

40. The apparatus of claim 36 further comprising means for generating said transmission key and said third strictly private key.

41. The apparatus of claim 36 further comprising means for transmitting said third strictly private key to said recipient via a secure communications channel.

42. The apparatus of claim 36 further comprising means for publishing said transmission key.

43. The apparatus of claim 36 further comprising:

means for enabling said sender to make a copy of said encrypted acknowledgment; and means for enabling said sender to incorporate said encrypted acknowledgment copy into said artifact such that functionality of said artifact is not affected.

44. The apparatus of claim 36 further comprising means for authenticating that said returned encrypted acknowledgment originated from said recipient, authenticating comprises means for enabling said recipient to encrypt with said third strictly private key said encrypted acknowledgment so that it is decryptable only by said transmission key.

45. The apparatus of claim 44 wherein said means for authenticating further comprises:

means for enabling said sender to make a copy of said returned encrypted acknowledgment; and means for enabling said sender to use said transmission key to decrypt said returned encrypted acknowledgment copy.

46. The apparatus of claim 45 wherein said means for authenticating further comprises means for enabling said sender to save said returned encrypted acknowledgment copy.

47. The apparatus of claim 45 wherein said means for authenticating comprises:

means for enabling said recipient to transmit said encrypted acknowledgment to a trusted third party;

means for enabling said trusted third party to certify that said encrypted acknowledgment originated from said recipient; and means for enabling said trusted third party to transmit evidence of said certification and said encrypted acknowledgment to said sender.

48. The apparatus of claim 47 wherein said trusted third party uses Kerberos.

49. Apparatus for validating receipt of an artifact conveyed as an encrypted electronic message from a sender to a recipient, the apparatus comprising:

means for enabling said recipient requesting said artifact;

means for enabling said sender to encrypt said artifact so that it is decryptable only by a strictly private key known to said sender with dissemination of said strictly private key controlled only by said sender;

means for sending said encrypted artifact to said recipient;

means for enabling said recipient to copy said encrypted artifact;

means for returning a copy of said encrypted artifact to said sender;

wherein said means for returning further comprising means for forwarding payment for said requested artifact to said sender along with said encrypted acknowledgement copy;

means for enabling said sender to use said strictly private key to decrypt said returned encrypted artifact copy to verify receipt by said recipient of said encrypted artifact;

means for sending said strictly private key to said recipient after said verification; and means for enabling said recipient to use said sent strictly private key to decrypt said encrypted artifact.

50. Apparatus for validating receipt of an artifact conveyed as an encrypted electronic message from a sender to a recipient, the apparatus comprising:

means for enabling said recipient requesting said artifact;

means for enabling said sender to encrypted said artifact so that it is decryptable only by a strictly private key known to said sender with dissemination of said strictly private key controlled only by said sender;

means for transmitting said strictly private key to said recipient via a secure communications channel;

means for sending said encrypted artifact to said recipient;

means for enabling said recipient to copy said encrypted artifact;

means for returning a copy of said encrypted artifact to said sender;

means for enabling said sender to use said strictly private key to decrypt said returned encrypted artifact copy to verify receipt by said recipient of said encrypted artifact;

means for sending said strictly private key to said recipient after said verification; and means for enabling said recipient to use said sent strictly private key to decrypt said encrypted artifact.

51. A system for validating receipt of an artifact conveyed as an encrypted electronic message from a sender to a recipient, the system comprising:

a first terminal for said sender;

a second terminal for said recipient;

logic executable by said second terminal for requesting an artifact;

logic executable by said first terminal for sending said requested artifact;

logic executable by said first terminal for encrypting an artifact so that it is decryptable only by a first strictly private key known to said sender with dissemination of said first strictly private key controlled only by said sender;

logic executable by said first terminal for encrypting an acknowledgment so that it is decryptable only by a second strictly private key known to said sender with dissemination of said second strictly private key controlled only by said sender;

logic executable by said first terminal for encrypting with a transmission key said encrypted artifact and said encrypted acknowledgment together as a single encrypted message decryptable only by a third strictly private key known to said recipient with dissemination of said third strictly private key controlled only by said recipient;

logic executable by said first terminal for sending said single encrypted message to said recipient;

logic executable by said second terminal for decrypting said single encrypted message using said third strictly private key to separate said encrypted artifact and said encrypted acknowledgment;

logic executable by said second terminal for returning said encrypted acknowledgment to said sender after using said third strictly private key;

logic executable by said first terminal for decrypting said returned encrypted acknowledgment using said first strictly private key to verify receipt by said recipient of said encrypted artifact;

logic executable by said first terminal for sending said second strictly private key to said recipient after said verification; and logic executable by said second terminal for decrypting said encrypted artifact using said sent second strictly private key.

52. The system of claim 51 further comprising:

logic executable by said first terminal for copying said encrypted acknowledgment; and logic executable by said first terminal for incorporating a copy of said encrypted acknowledgment copy into said artifact prior to encrypting said artifact in such a manner that the functionality of the artifact is not affected by said incorporation.

53. The system of claim 51 further comprising:

logic executable by said second terminal for encrypting with said third strictly private key said encrypted acknowledgment so that it is decryptable only by said transmission key;

logic executable by said first terminal for making a copy of said returned encrypted acknowledgment;

logic executable by said first terminal for decrypting said returned encrypted acknowledgment using said transmission key; and logic executable by said first terminal for saving said returned encrypted acknowledgment copy.

54. A system for validating receipt of an artifact conveyed as an encrypted electronic message from a sender to a recipient, the system comprising:

a first terminal for said sender;

a second terminal for said recipient;

logic executable by said second terminal for requesting an artifact;

logic executable by said first terminal for sending said requested artifact;

logic executable by said first terminal for encrypting an artifact so that it is decryptable only by a strictly private key known to said sender with dissemination of said strictly private key controlled only by said sender;

logic executable by said first terminal for sending said encrypted artifact;

logic executable by said second terminal for copying said encrypted artifact;

logic executable by said second terminal for returning a copy of said encrypted artifact to said sender;

logic executable by said first terminal for decrypting said returned encrypted artifact copy using said strictly private key to verify receipt by said recipient of said encrypted artifact;

logic executable by said first terminal for sending said strictly private key to said recipient via a secure communication channel after said verification; and logic executable by said second terminal for decrypting said encrypted artifact using said sent strictly private key.

* * * * *